(12) United States Patent
Velusamy et al.

(10) Patent No.: US 8,738,094 B2
(45) Date of Patent: May 27, 2014

(54) AUTOMATICALLY ENABLING WIRELESS COMMUNICATION

(75) Inventors: Senthil Kumar Mulluppadi Velusamy, Bellevue, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 278 days.

(21) Appl. No.: 12/964,620

(22) Filed: Dec. 9, 2010

(65) Prior Publication Data

US 2012/0149312 A1 Jun. 14, 2012

(51) Int. Cl.
*H04M 1/00* (2006.01)
*H04B 1/38* (2006.01)
(52) U.S. Cl.
USPC .......................... 455/573; 455/68; 455/556.1
(58) Field of Classification Search
USPC .......................................... 455/68, 556.1, 573
See application file for complete search history.

(56) References Cited

U.S. PATENT DOCUMENTS

| 7,889,092 | B2* | 2/2011 | Volk et al. ................. 340/691.5 |
| 2003/0139180 | A1 | 7/2003 | McIntosh et al. |
| 2009/0191925 | A1* | 7/2009 | Moseler et al. ............... 455/573 |
| 2010/0302980 | A1* | 12/2010 | Ji et al. .......................... 370/311 |
| 2011/0047394 | A1* | 2/2011 | Sato ............................ 713/310 |

FOREIGN PATENT DOCUMENTS

KR 100944152 B1 2/2010

OTHER PUBLICATIONS

The PCT Search Report and Written Opinion mailed Jul. 11, 2012 for PCT Application No. PCT/US11/63791, 9 pages.

* cited by examiner

*Primary Examiner* — Tuan H Nguyen
(74) *Attorney, Agent, or Firm* — Lee & Hayes, PLLC (57) ABSTRACT

A telecommunication device configured to determine at least one of an occurrence of a charging event associated with the telecommunication device or presence of the telecommunication device at or proximate to a specified location is described herein. Based at least in part on the determining, the telecommunication device automatically enables a wireless communication transceiver of the telecommunication device to communicate over a wireless data network.

20 Claims, 4 Drawing Sheets

AUTOMATICALLY ENABLING WIRELESS COMMUNICATION

BACKGROUND

In recent years, telecommunication devices have advanced from offering simple voice calling services to providing users with many new features. Telecommunication devices now provide messaging services such as email, text messaging, and instant messaging; data services such as Internet browsing; media services such as storing and playing a library of favorite songs; location services; and many others. Telecommunication devices are also now equipped with cameras capable of capturing one or both of images and videos. While these new features greatly enhance the utility of the telecommunication device to its user, they also pose new problems. Images and videos captured by the telecommunication device must be backed up to prevent data loss. And software enabling the many new services offered by the telecommunication device must be updated. Both of these problems point to an increased usage of data communication through the telecommunication service provider network. Such data communication is often governed by a data plan specifying a price associated with a specific data transfer size. Frequent transfers of large files necessitated by these new telecommunication device features, then, can quickly become very expensive and also overload the service provider network.

To avoid data transfers through their telecommunication service provider network, telecommunication device users occasionally utilize wireless communication transceivers of their telecommunication devices, such as Wi-Fi or Wi-Max radios, to connect to local wireless data networks in order to transfer data over those networks. For example, homes and offices typically have wireless data networks that computing devices and telecommunication devices can connect to, the wireless data networks providing connectivity to the Internet and devices reachable over the Internet. These wireless data networks are under-utilized, however, because telecommunication devices typically are operated with their wireless communication transceivers disabled. Wireless communication transceivers consume substantial battery power when enabled, making it difficult to operate telecommunication devices with the transceivers always on. And because disabled is the typical default, users often forget to enable the wireless communication transceivers of their telecommunication devices when they come into the vicinity of a wireless data network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a telecommunication device that automatically enables its wireless communication transceiver based at least in part on detecting the occurrence of a charging event or on a determination that the telecommunication device is at or proximate to a specified location. As used herein, "wireless communication transceiver" refers to a radio for local wireless communication, such as a Wi-Fi radio or Wi-Max radio, and not to the radio for cellular networks, such as a radio for a GSM network or a HSPA network. The telecommunication device also includes a radio for cellular networks, though. The telecommunication device then utilizes the enabled wireless communication transceiver to download software updates, recover data, or back-up data over a wireless data network. The wireless data network is a different network than the telecommunication service provider network that the telecommunication device may be connected to. Such a wireless data network may be a wireless network of a home or office that has an access point or "hot spot" for wirelessly communicating with the telecommunication device. The access point then in turn communicates with another network, such as the Internet, allowing the telecommunication device to communicate with network-accessible servers and storage. The wireless communication transceiver that communicates with the access point may be a Wi-Fi radio or Wi-Max radio. The back-up data or recovered data may include, but is not limited to, content like pictures, videos, and audio files. The downloaded updates may include software updates for the telecommunication device platform and third party applications, as well as other data, such as large media files.

In some implementations, the automatic enabling of the wireless communication transceiver is responsive to the telecommunication device detecting the occurrence of a charging event. The charging event may be, for example, the plugging of a charging component (e.g., power cord) that is connected to the telecommunication device into a power outlet. In response to detecting the plug-in, the telecommunication device may automatically enable the wireless communication transceiver, connect to the wireless data network, and begin backing up data, recovering data, and downloading updates. In some implementations, upon detecting the charging event but prior to enabling the wireless communication transceiver, the telecommunication device performs at least one of determining a current location, determining a duration since the charging event, or determining a battery power level. The choice of which actions to perform may be based at least in part on telecommunication device settings. The settings may also specify thresholds, such as specified locations, a battery power level, or a minimum duration. Meeting of the thresholds may be a condition that is met before the telecommunication device performs the automatic enabling.

In one implementation, the charging event may be the plugging of a universal serial bus (USB) cord attached to the telecommunication device into a USB port of a computing device. In response to such a charging event, the telecommunication device engages in data communication through the USB port in place of automatically enabling the wireless communication transceiver.

In some implementations, the automatic enabling of the wireless communication transceiver is responsive to the telecommunication device determining that the telecommunication device is at or proximate to a specified location. This determination may be made independently of the occurrence or non-occurrence of a charging event. If the telecommunication device is determined to be at a specified location, such as a home, office, or other location likely to offer wireless data connectivity, the telecommunication device may automatically enable the wireless communication transceiver, connect to the wireless data network, and begin backing up data, recovering data, and downloading updates. In various implementations, the telecommunication device determines whether it is at the specified location by either determining its current location or receiving its location from a remote server and comparing the determined or received location to a list of specified locations. In some implementations, upon determining that the telecommunication device is at the specified location but prior to enabling the wireless communication transceiver, the telecommunication device performs at least one of determining a duration since the charging event or determining a battery power level. The choice of which actions to perform may be based at least in part on telecommunication device settings. The settings may also specify thresholds, such as a battery power level or a minimum duration. Meeting of the thresholds may be a condition that is met before the telecommunication device performs the automatic enabling.

In various implementations, the telecommunication device offers application programming interfaces (APIs) that enable third party applications to back-up data, recover data, or download updates in response to the automatic enabling of the wireless communication transceiver. In some implementations, such as implementations where the telecommunication device acts as an access point or "hot spot" for other computing devices and telecommunication devices, the APIs may enable platforms or applications of these other devices to back-up data, recover data, or download updates in response to the automatic enabling of the wireless communication transceiver.

Example Operating Environment

Figure 1:
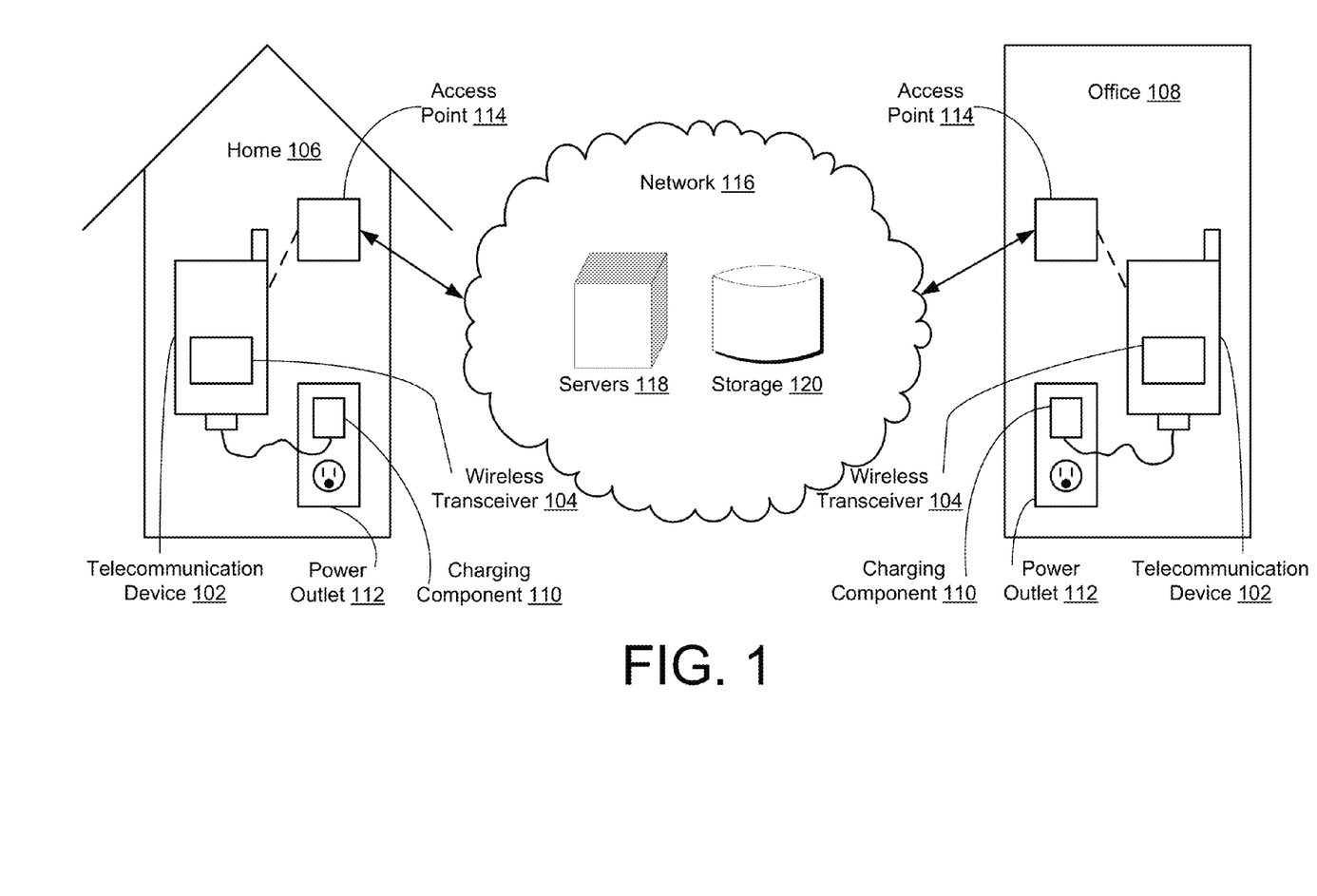
FIG. 1 is a block diagram showing an operating environment in which a telecommunication device automatically enables its wireless communication transceiver to communicate over a wireless data network based on at least one of a charging event or a device location, in accordance with various embodiments.

FIG. 1 is a block diagram showing an operating environment in which a telecommunication device automatically enables its wireless communication transceiver to communicate over a wireless data network based on at least one of a charging event or a device location, in accordance with various embodiments. As shown in FIG. 1, a telecommunication device 102 is equipped with at least one wireless communication transceiver 104. In some implementations, the telecommunication device 102 is equipped with multiple wireless communication transceivers 104, such as a transceiver for each of multiple wireless networks. The wireless communication transceiver 104 may be enabled to communicate over a wireless data network, such as the sort of wireless data network that is often found in a home 106 or office 108. The telecommunication device 102 may also be equipped with other transceivers for communicating over a telecommunication service provider network.

In some implementations, the telecommunication device 102 is attached to a charging component 110, such as a power cord, that may be plugged into a power outlet 112. The telecommunication device 102 may be configured to detect the occurrence of a charging event representing the plugging of the charging component 110 into the power outlet 112 and, based on detecting the charging event, to automatically enable the wireless communication transceiver 104 to communicate over the wireless data network in the home 106 or office 108 to an access point 114 located in or proximate to the home 106 or office 108 and offering the wireless data network. In some implementations, the telecommunication device 102 may also or instead be configured to determine whether it is at or proximate to a specified location (e.g., home 106 or office 108) and, based on the determination, to automatically enable the wireless communication transceiver 104.

Once the telecommunication device 102 has automatically enabled the wireless communication transceiver 104, the telecommunication device 102 communicates with a network 116, such as the Internet, through the wireless data network offered by the access point 114. The telecommunication device 102 communicates with one or both of servers 118 and storage 120 to back up data stored on the telecommunication device 102 or to download software updates or recover data.

Figure 2:
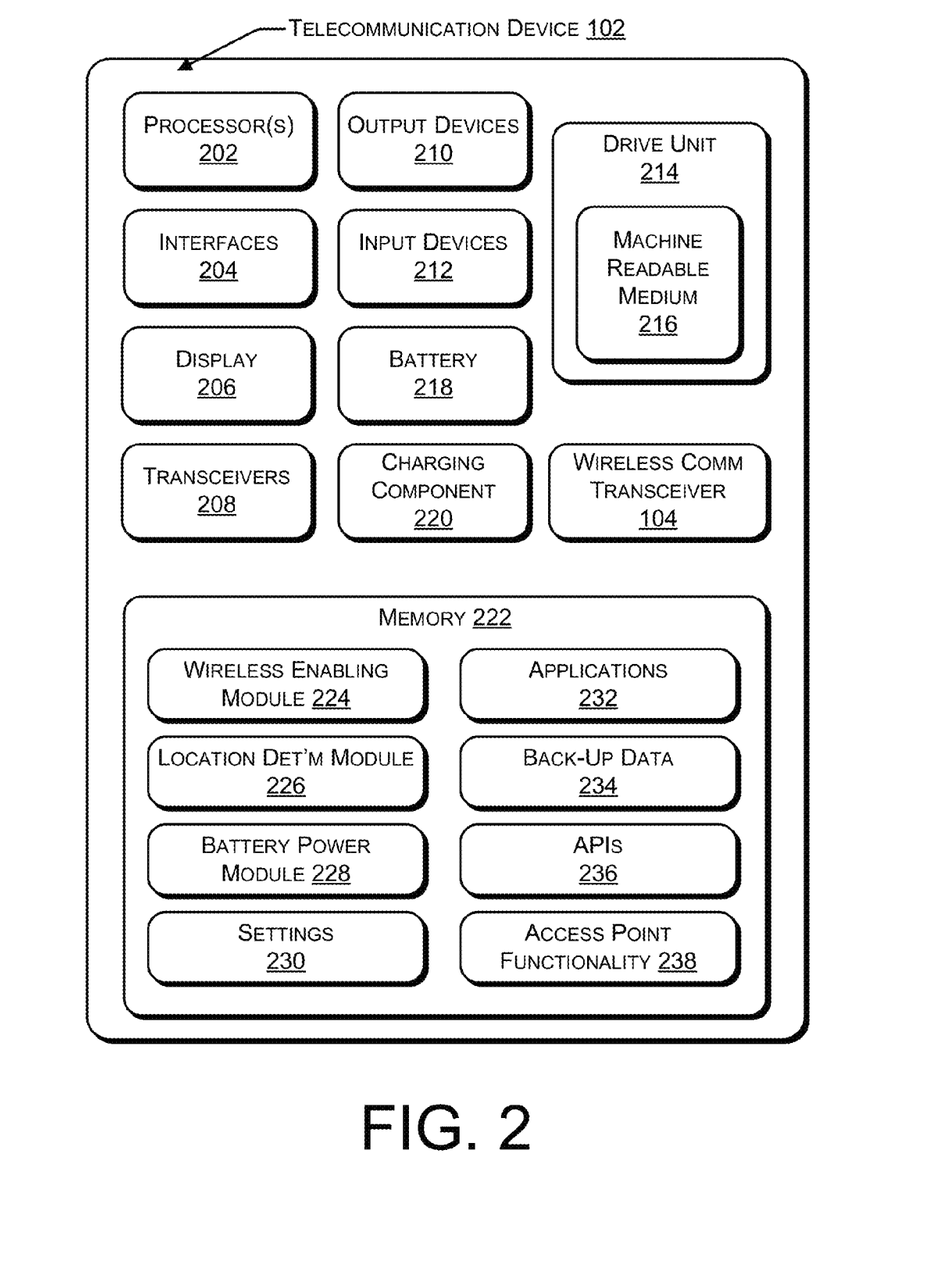
FIG. 2 is a block diagram of an example telecommunication device system architecture, in accordance with various embodiments.

In various implementations, the telecommunication device 102 shown in FIG. 1 is any sort of computing device. The telecommunication device 102 can be a cellular phone, a personal digital assistant (PDA), a personal computer (PC), a laptop computer, a workstation, a server system, a tablet computer, a television, a media player, a digital video recorder, a game device, or a set-top box, or any other sort of device. An example telecommunication device 102 is illustrated in FIG. 2 and is described below in further detail in reference to that figure.

As further shown in FIG. 1, the telecommunication device 102 is equipped with a wireless communication transceiver 104 that can be enabled or disabled by the telecommunication device 102 (i.e., turned "on" or "off"). The wireless communication transceiver 104 may be any sort of transceiver that communicates over a wireless data network. For example, the wireless communication transceiver 104 may be one of a Wi-Fi radio or a Wi-Max radio for communicating across a wireless local area network (LAN) of the sort typically found in a home 106 or office 108. As described further herein, the wireless communication transceiver 104 may be automatically enabled or disabled by the telecommunication device 102. In some implementations, the wireless communication transceiver 104 may also be enabled or disabled by a user of the telecommunication device 102 through one or more user interfaces provided by the telecommunication device 102, such as a settings menu.

In various implementations, home 106 and office 108 represent locations associated with the wireless data networks over which the wireless communication transceiver 104 communicates. Both home 106 and office 108 include access points 114 which provide the wireless data networks and act as routers providing connectivity to network 116. While home 106 and office 108 are shown in FIG. 1, any location or locations likely to provide wireless data network access may be utilized in conjunction with the automatic enabling techniques described herein.

In some implementations, home 106 or office 108 may be included in a list of specified locations stored on or provided to the telecommunication device 102. In such implementations, the telecommunication device 102 conditionally performs the automatic enabling of the wireless communication transceiver based on whether the telecommunication device 102 is at or proximate to one of the specified locations. To determine whether the telecommunication device 102 is at or proximate to a specified location, the telecommunication device 102 may either determine its current location or receive its location from a remote server, such as a server of a telecommunication service provider network. Once the telecommunication device 102 has determined or received its current location, the telecommunication device 102 compares the current location to the list of specified locations to determine whether the current location is identical to or proximate to one of the specified locations. The presence of the home 106 or office 108 on the list of specified locations may have been entered by a user of the telecommunication device 102 or may have been included by a telecommunication service provider that created the list of specified locations and provided the list to the user of the telecommunication device 102.

As further illustrated in FIG. 1 and mentioned above, the telecommunication device 102 is attached to a charging component 110 that may be plugged into a power outlet 112. The charging component 110 may be a standard power cord or any sort of a number of power cords that are typically used with telecommunication devices. The power outlet 112 may also be a typical power outlet as is found in any home 106 or office 108. In other implementations, the charging component 110 is a universal serial bus (USB) cord and the power outlet 112 is a USB port of a computing device.

In various implementations, as mentioned above, plugging the charging component 110 into a power outlet 112 generates a charging event that can be recognized by utilizing an application programming interface (API) of the telecommunication device platform. The telecommunication device 102 may listen for charging events and, upon detecting a charging event, automatically enable the wireless communication transceiver 104 to communicate over the wireless data network of the home 106 or office 108.

In some implementations, however, the automatic enabling is performed conditionally. As mentioned above, the automatic enabling may be performed conditionally based on whether the telecommunication device 102 is at or proximate to a specified location. In addition to this, the automatic enabling may also be performed conditionally based whether the battery power level of the telecommunication device 102 exceeds a threshold or on whether a duration of time since the charging event exceeds a threshold. The thresholds, the specified locations, and indications of whether the automatic enabling is to be performed conditionally based on any one or more of the above factors may be found in settings of the telecommunication device 102 that the telecommunication device 102 may check before performing the automatic enabling. The reason for checking location, battery power level, or duration since the charging event is to ensure that the power consumed by the enabled wireless communication transceiver 104 is accounted for by sufficient battery power or by a likelihood that the telecommunication device 102 will be charging for a sufficient amount of time.

In other implementations, the telecommunication device 102 determines that the charging event represents the plugging of a USB cord into a USB port. In such implementations, the telecommunication device 102 may engage in data communication through the USB connection instead of enabling the wireless communication transceiver 104 on the assumption that the computing device having the USB port is connected in a wired or wireless manner to network 116.

In various implementations, once the telecommunication device 102 has automatically enabled the wireless communication transceiver 104, the telecommunication device 102 establishes a connection with the access point 114 over the wireless data network. As mentioned above, the wireless data network may be a wireless LAN. In other implementations, however, the wireless data network may instead be a wireless wide area network (WAN) or wireless personal area network (PAN), or some combination of LANs, WANs, or PANs. The access point 114 providing the wireless data network may be any sort of wireless router known in the art. The access point 114 may be a dedicated wireless router or a multi-function computing device or telecommunication device that is in turn connected to a router of an Internet service provider (ISP), such as a digital subscriber line (DSL) or cable modem. Through the ISP, the access point is connected to a larger network 116, such as the Internet.

Communication over the wireless data network may be in place or concurrent with communication over a telecommunication service provider network. Transfers of large data files, for example, may be reserved for communication over the wireless data network.

In some implementations, network 116 is the Internet. In other implementations, network 116 represents other WANs, LANs, PANs, or any combination of these networks. As shown in FIG. 1, one or more servers 118 and storage devices 120 may be accessible through the network 116 to provide a number of data services to the telecommunication device 102. The servers 118 and storage devices 120 may in turn be any sort of computing devices known in the art that offer services or storage. These servers 118 and storage devices 120 may be associated with applications of the telecommunication device 102, with the telecommunication service provider, or may be any other sort of servers and storage devices. In one implementation, servers 118 and storage devices 120 include a virtual data storage server offered by the telecommunication service provider and accessible over the Internet that provides a central back-up repository for telecommunication device data, such as media files and other contents.

Once the telecommunication device 102 has established a wireless connection to the access point 114, the telecommunication device 102 performs one or more of downloading updates, recovering data, and backing up data. The download, recovery, and back-up operations performed by the telecommunication device 102 may, in some implementations, be specified by a list of applications requiring updates, recovery, or backing-up. Such a list may be created by the telecommunication device 102 concurrently with usage of applications and device features to capture and download media files and other content. Alternatively or additionally, such a list may also be created based on calling of API functions offered by the telecommunication device 102 to applications of the telecommunication device 102 or to other devices or applications that are connected to the telecommunication device 102. Such API functions may register the applications or devices as requesting updating, recovery, or backing-up. When the telecommunication device 102 automatically enables the wireless communication transceiver 104, then, the telecommunication device 102 may utilize the list to gather data to be backed-up or to identify requested updates.

In some implementations, the telecommunication device 102 then communicates the data to be backed-up to the servers 118 or storage devices 120 or downloads updates or recovery data from the servers 118 or storage devices 120. The telecommunication device 102 may continue to perform the downloading, recovery, or backing up until completed or until another event. Such other events could include a change in location, in battery power level, or a new charging event indicating that the charging component 110 has been unplugged from the power outlet 112. In response to this other event, the telecommunication device may also automatically disable the wireless communication transceiver 104.

Example System Architecture

FIG. 2 is a block diagram of an example telecommunication device system architecture, in accordance with various embodiments. As shown, the telecommunication device 102 may include processor(s) 202, interfaces 204, a display 206, transceivers 208, output devices 210, input devices 212, and drive unit 214 including a machine readable medium 216. The telecommunication device 102 may also include a battery 218, a charging component 220, and a wireless communication transceiver 104. The telecommunication device 102 further includes a memory 222, the memory 222 storing a wireless enabling module 224, a location determination module 226, a battery power module 228, settings 230, applications 232, back-up data 234, application programming interfaces (APIs) 236, and access point functionality 238.

In some embodiments, the processor(s) 202 is a central processing unit (CPU), a graphics processing unit (GPU), or both CPU and GPU, or any other sort of processing unit.

In various embodiments, the interfaces 204 are any sort of interfaces. Interfaces 204 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. Such an interface 204 may comprise logic or a device driver associated with a wireless communication transceiver 104 such as a Wi-Fi radio or a Wi-Max radio and may provide a method that enables the wireless communication transceiver 104 to be enabled or disabled. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 206 is a liquid crystal display or any other type of display commonly used in telecommunication devices. For example, display 206 may be a touch-sensitive display screen, and can then also act as an input device or keypad, such as for providing a soft-key keyboard, navigation buttons, or the like.

In some embodiments, the transceivers 208 include any sort of transceivers known in the art. For example, transceivers 208 may include a radio transceiver that performs, in conjunction with an interface 204, the function of transmitting and receiving radio frequency communications via an antenna. The radio interface may facilitate wireless connectivity between the telecommunication device 102 and various cell towers, base stations and/or access points of a telecommunication service provider network. The transceivers 208 may also include the wireless communication transceiver 104 and the near field antenna for communicating over local wireless data networks and for near field communications, respectively.

In some embodiments, the output devices 210 include any sort of output devices known in the art, such as a display (already described as display 206), speakers, a vibrating mechanism, or a tactile feedback mechanism. Output devices 210 also include ports for one or more peripheral devices, such as headphones, peripheral speakers, or a peripheral display.

In various embodiments, input devices 212 include any sort of input devices known in the art. For example, input devices 212 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 216 stores one or more sets of instructions (e.g., software) embodying any one or more of the methodologies or functions described herein. The instructions may also reside, completely or at least partially, within the memory 222 and within the processor(s) 202 during execution thereof by the telecommunication device 102. The memory 222 and the processor(s) 202 also may constitute machine readable media 216.

In various implementations, battery 218 may be any sort of telecommunication device battery known in the art. For example, battery 218 may be a lithium-ion battery. Battery 218 may be rechargeable through power received by an internal charging component 220. The internal charging component 220 may comprise, for example, a charge port for receiving the charging component 110 as well as other components known in the art and used to convey power from a charge port to a battery.

Wireless communication transceiver 104 has been described above in detail. As mentioned above, the wireless communication transceiver 104 may be a Wi-Fi or Wi-Max radio and may be associated with an interface that offers methods for enabling and disabling the wireless communication transceiver 104.

In various embodiments, memory 222 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Additionally, in some embodiments, memory 222 includes a SIM (subscriber identity module) card, which is a removable memory card used to identify a user of the telecommunication device 102 to a service provider network. Memory 222 can also be described as computer storage media and may include volatile and nonvolatile, removable and non-removable media implemented in any method or technology for storage of information, such as computer readable instructions, data structures, program modules, or other data.

As illustrated in FIG. 2, the memory 222 store data and modules 224-238. These modules may comprise methods, threads, processes, applications or any other sort of executable instructions for performing the operations described for each below. Also, any of the modules may form part of a telecommunication device platform that includes an operating system and applications or may instead be third party applications.

In various implementations, the wireless enabling module 224 is configured to automatically enable or disable the wireless communication transceiver 104. To determine when to perform the automatic enabling or disabling, the wireless enabling module 224 listens for the occurrence of charging events through an interface of the internal charging component 220. The interface may comprise one or more APIs that enable the wireless enabling module 224 to determine the charging state of the telecommunication device 102. In other implementations, rather than listening for charging events, the wireless enabling module 224 may periodically check the charging state of the telecommunication device 102 by periodically invoking the API of the internal charging component interface.

In some implementations, after detecting a charging event, the wireless enabling module 224 determines if the charging event was the plugging of a USB cord into a USB port of a computing device. If so, then the wireless enabling module 224 may refraining from automatically enabling the wireless communication transceiver 104 and may instead engage in data communication over a USB connection between the telecommunication device 102 and computing device, performing the downloading, recovery, and backing-up described below over the USB connection.

Alternatively or additionally, the wireless enabling module 224 may invoke the location determination module 226 to determine the current location of the telecommunication device 102. In some implementations, the wireless enabling module 224 may perform this invoking periodically, regardless of the charging state of the telecommunication device 102. In other implementations, the location determination module 226 may instead invoke the wireless enabling module 224 in response to receiving a current telecommunication device location from a remote server and may instruct the wireless enabling module 224 to automatically enable the wireless communication transceiver 104. Upon receiving the current location, the wireless enabling module 224 may compare the current location to a list of specified locations to determine if the telecommunication device 102 is at or proximate to one of the specified locations. As discussed above, the list of specified locations may be stored in settings 230 of the telecommunication device 102.

In various implementations, the wireless enabling module 224 may then automatically enable the wireless communication transceiver 104 based on the occurrence of the charging event or on the determination that the telecommunication device 102 is at the specified location. In other implementations, the wireless enabling module 224 performs the automatic enabling conditionally based on telecommunication device settings 230. In such implementations, following the detection of the charging event or the location determination, the wireless enabling module 224 checks the settings 230 to determine whether there are conditions related to location, battery power level, or duration since the charging event. If there are conditions related to location, the wireless enabling module 224 invokes the location determination module 226 in the manner described above (if this has not occurred already) to determine if the current location is one of a list of specified locations included in the settings 230. If there are conditions related to battery power level, the wireless enabling module 224 invokes the battery power module 228 to determine the current battery power level. The wireless enabling module 224 then compares the current battery power level to a threshold specified in the settings 230 and proceeds with the automatic enabling off if the current battery power level meets or exceeds the threshold. If there are conditions related to a duration since the charging event, the wireless enabling module 224 may check a log of charging events that is maintained by the wireless enabling module 224 or by the telecommunication device platform to determine the time at which the last charging event occurred. In some implementations, the wireless enabling module 224 then calculates a duration since that time and compares it to a threshold specified in the settings 230 and proceeds with the automatic enabling off if the duration meets or exceeds the threshold.

In some implementations, the wireless enabling module 224 automatically enables the wireless communication transceiver 104 upon ensuring that any conditions imposed by settings 230 are met. To automatically enable the wireless communication transceiver 104, the wireless enabling module 224 may invoke a method offered by an interface of the wireless communication transceiver 104 that switches the wireless communication transceiver 104 to an "on" mode of operation. Either logic associated with the wireless communication transceiver 104 or the wireless enabling module 224 then establishes a connection with the access point 114 across a wireless data network offered by the access point 114, as is described above.

Once a connection over the wireless data network is established, the wireless enabling module 224 determines if there is any back-up data 234 to transmit or any software updates to download. The wireless enabling module 224 may, in some implementations, keep a log of requests for downloads, recoveries, and back-ups received from applications 232 of the telecommunication device 102 and, upon connecting to the wireless data network, may perform the downloads, recoveries, and back-ups on behalf of the applications 232. In one implementation, the wireless enabling module 224 may cache the back-up data 234 that is to be stored on remote servers 118 and storage devices 120. In other implementations, the wireless enabling module 224 may invoke the applications 232 to obtain the back-up data 234.

In some implementations, rather than performing the back-up operations, recovery operations, and downloads, the wireless enabling module 224 may notify the applications 232 of the connection to the wireless data network, enabling the applications 232 to connect to and communicate with servers 118 and storage devices 120.

In further implementations, the wireless enabling module 224 may automatically disable the wireless communication transceiver 104 based on a further charging event (e.g., disconnecting from the power outlet 112), on a change in the current location, or on a decrease in the battery power level below a threshold found in the settings 230. In some implementations, the wireless enabling module 224 may monitor for these events and changes.

In various implementations, the location determination module 226 may be invoked by the wireless enabling module 224, as mentioned above. The wireless enabling module 224 may invoke the location determination module 226 periodically or in response to detection of a charging event. Once invoked, the location determination module 226 uses any of a number of location determination mechanisms at its disposal. For example, if the telecommunication device 102 is equipped with global positioning system (GPS) mechanisms, the location determination module 226 may utilize the GPS mechanism to determine the current telecommunication device location. In other implementations, the location determination module 226 may perform cell tower triangulation based on locations of cell towers having the strongest signals. In yet other implementations, the location determination module 226 may simply request the current location from a server of the telecommunication service provider network. Once the location determination module 226 has determined the current location, the location determination module 226 may provide the current location to the wireless enabling module 224 in a return message.

In other implementations, rather than being invoked by the wireless enabling module 224, the location determination module 226 receives a message from a server of the telecommunication service provider network that includes the current location of the telecommunication device 102 and an instruction to automatically enable the wireless communication transceiver 104. In response to receiving such a message, the location determination module 226 invokes the wireless enabling module 224, providing the wireless enabling module 224 with the current location and the instruction.

In some implementations, the battery power module 228 may be invoked by the wireless enabling module 224 with a request for the current battery power level. In response, the battery power module 228 may check with an interface of the battery 218 to determine its current level of charge and may provide that level of charge to the wireless enabling module 224 in a response message. The current battery power level may be given as a fraction, a percentage, a decimal, or any sort of number or textual or graphic description.

In various implementations, settings 230 may include conditions and lists or thresholds associated with those conditions. As described above, settings 230 may include conditions associated with location, battery power level, or duration since a charging event that must be met before the wireless enabling module 224 automatically enables the wireless communication transceiver 104. The location condition may be associated with a list of specified locations. The battery power level and the duration since the charging event may each be associated with a threshold. The conditions, locations, and thresholds may be selected or set through a settings user interface offered by the telecommunication device 102 that allows a user to select which of the conditions will apply and what the locations/thresholds associated with those conditions will be. In some implementations, the settings 230 may comprise default settings that may be updated by a user. To check the conditions and their associated locations/thresholds, the wireless enabling module 224 may retrieve the setting data by, for example, invoking one or more methods associated with the settings 230.

In some implementations, the applications 232 may be applications of the telecommunication device platform or may be third party applications. The applications may register with the wireless enabling module 224 through an API 236 and may request performance of download, recovery, or back-up operations. If requesting a back-up operation, the applications may provide the back-up data 234 to the wireless enabling module 224 for caching. In other implementations, the applications 232 may request that the wireless enabling module 224 notify them when connectivity to a wireless data network is achieved and may then perform the back-up, recovery, and download operations themselves by contacting servers 118 or storage devices 120.

Back-up data 234 may be any sort of data, such as media files or other content. For example, back-up data 234 may include images or videos captured by a camera of telecommunication device 102 or movies and songs downloaded to the telecommunication device 102. The back-up data may be associated with an application 232 and may be cached by the wireless enabling module 224 prior to backing up to a remote server 118 or storage device 120.

In various implementations, the APIs 236 may be any sort of APIs associated with logic and providing interfaces that allow one module to invoke methods of another module. In some implementations, APIs 236 include APIs of the wireless enabling module 224 that enable applications 232 to invoke methods of the wireless enabling module 224, such as those described above. Also, in some implementations, APIs 236 include APIs of the wireless enabling module 224 that enable other devices or applications of other devices to invoke methods of the of the wireless enabling module 224, such as those described above.

In some implementations, the access point functionality 238 of the telecommunication device 102 enables the telecommunication device 102 to serve as an access point for other devices, providing a further wireless data network over which the other devices may communicate with the telecommunication device 102. The access point functionality 238 may then further act as a router for traffic received from the other devices, passing the traffic on to the access point 114 for communication to the network 116.

Example Operations

Figure 3:
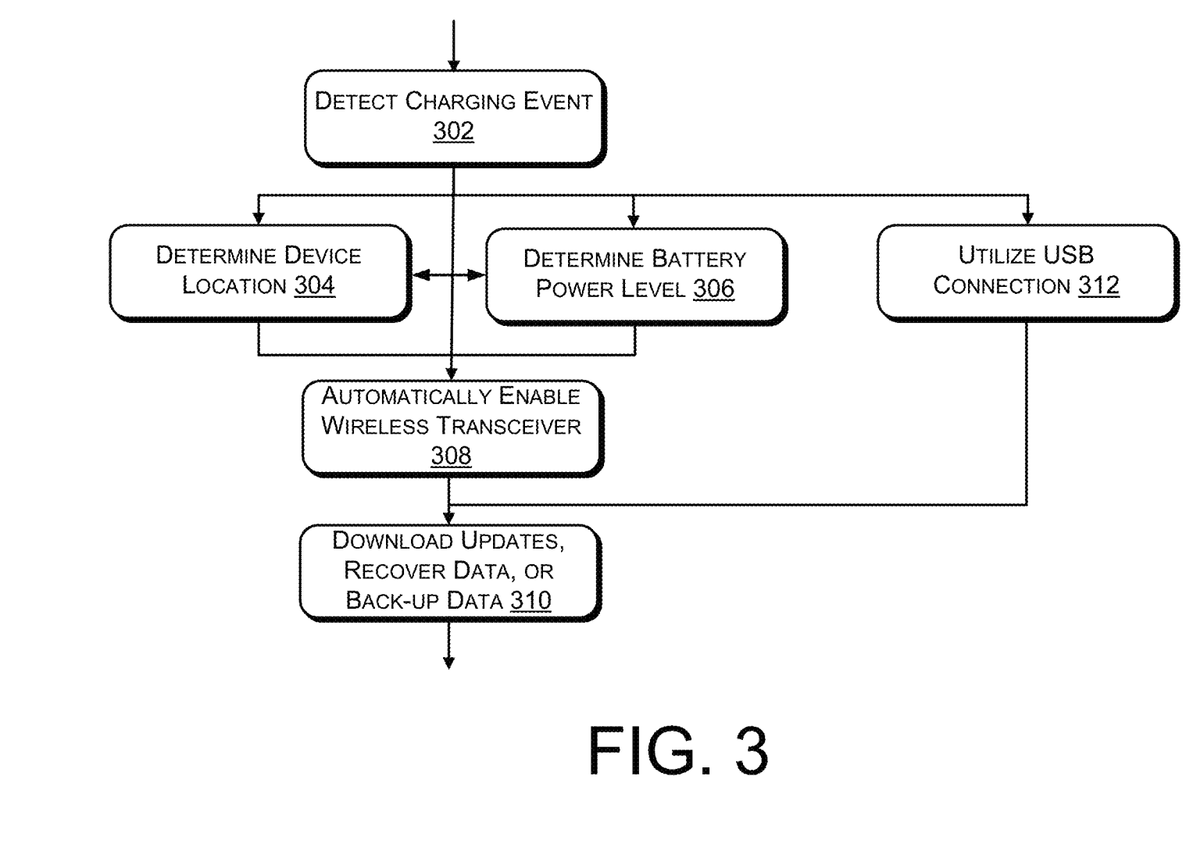
FIG. 3 is a flowchart showing a method of automatically enabling the wireless communication transceiver of a telecommunication device to communicate over a wireless data network based at least in part on a charging event, in accordance with various embodiments.

FIG. 3 is a flowchart showing a method of automatically enabling the wireless communication transceiver of a telecommunication device to communicate over a wireless data network based at least in part on a charging event, in accordance with various embodiments. As illustrated at block 302, a telecommunication device 102 detects an occurrence of a charging event associated with the telecommunication device 102. In some implementations, detecting the charging event comprises detecting that a charging component 110 connected to the telecommunication device 102 has been plugged into a power outlet 112.

At block 304, the telecommunication device 102 then optionally determines a location of the telecommunication device 102. At block 306, the telecommunication device 102 optionally determines a battery power level of the telecommunication device 102 or on a duration of time since detecting the charging event.

At block 308, the telecommunication device 102 automatically enables a wireless communication transceiver 104 of the telecommunication device 102 to communicate over a wireless data network. In some implementations, the telecommunication device 102 performs the automatic enabling conditionally based on one or more settings 230 of the telecommunication device 102 associated with the determined location or battery power level. Also, in some implementations, the wireless communication transceiver 104 is one of a Wi-Fi radio or a Wi-Max radio.

At block 310, the telecommunication device 102 performs at least one of downloading a software update, recovering data, or backing up data in response to the automatic enabling, wherein the downloading, recovering, or backing up is performed over the wireless data network.

At block 312, the telecommunication device 102 engages in data communication through a USB connection with a computing device in place of automatically enabling the wireless communication transceiver 104. The telecommunication device 102 engages in the data communication through the USB connection in response to detecting that the charging event comprises attachment of a universal serial bus (USB) cord of the telecommunication device 102 to a USB port of the computing device.

Figure 4:
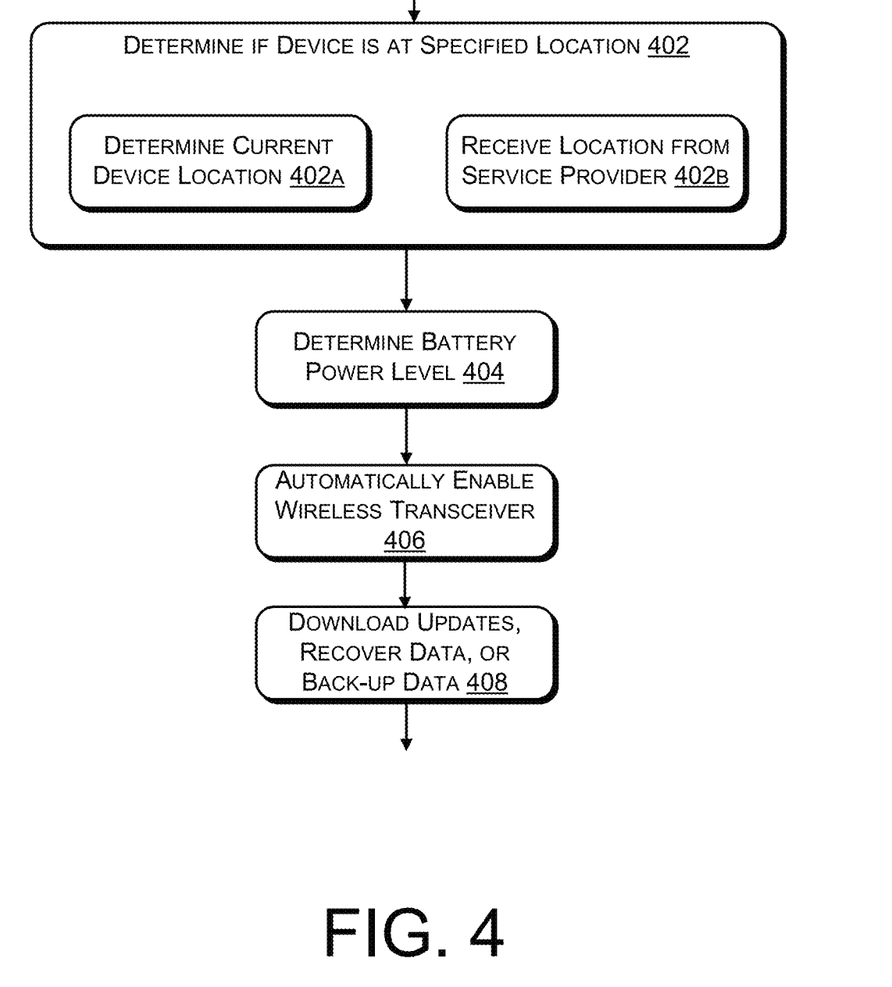
FIG. 4 is a flowchart showing a method of automatically enabling the wireless communication transceiver of a telecommunication device to communicate over a wireless data network based on at least in part on a device location, in accordance with various embodiments.

FIG. 4 is a flowchart showing a method of automatically enabling the wireless communication transceiver of a telecommunication device to communicate over a wireless data network based on at least in part on a device location, in accordance with various embodiments. As illustrated at block 402, a telecommunication device 102 determines that the telecommunication device 102 is at or proximate to a specified location. In some implementations, the specified location is one of a home 106, an office 108, or another location likely to have a wireless data network access point 114. At block 402a, the determining is shown as comprising the telecommunication device 102 determining a current location of the telecommunication device 102. At block 402b, the determining is shown as comprising receiving a message from a service provider informing the telecommunication device 102 that the telecommunication device 102 is at or proximate to the specified location. In some implementations, the message instructs the telecommunication device 102 to automatically enable the wireless communication transceiver 104.

At block 404, the telecommunication device 102 determines a battery power level of the telecommunication device 102.

At block 406, the telecommunication device 102 automatically enables a wireless communication transceiver 104 of the telecommunication device 102 to communicate over a wireless data network. In some implementations, the automatic enabling is performed conditionally based at least in part on the battery power level exceeding a threshold, the threshold defined by one or more settings 230 of the telecommunication device 102.

At block 408, the telecommunication device 102 performs at least one of downloading a software update, recovering data, or backing up data in response to the automatic enabling, wherein the downloading, recovering, or backing up is performed over the wireless data network.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    detecting, by a telecommunication device, an occurrence of a charging event associated with the telecommunication device, wherein the telecommunication device is in an on mode and a wireless communication transceiver of the telecommunication device is in an off mode when the occurrence is detected; and
    based at least in part on the charging event, automatically transitioning, by the telecommunication device, the wireless communication transceiver from the off mode to an on mode to cause the wireless communication transceiver to connect to and communicate over a wireless data network, the on mode and off mode of the wireless communication transceiver being separate and distinct from the on mode and an off mode of the telecommunication device.

2. The method of claim 1, wherein the wireless communication transceiver is one of a Wi-Fi radio or a Wi-Max radio.

3. The method of claim 1, wherein detecting the charging event comprises detecting that a charging component connected to the telecommunication device has been plugged into a power outlet.

4. The method of claim 1, further comprising performing at least one of downloading a software update, recovering data, or backing up data in response to the automatic transitioning, wherein the downloading, recovering, or backing up is performed over the wireless data network.

5. The method of claim 1, further comprising performing the automatic transitioning conditionally based at least in part on a battery power level of the telecommunication device or on a duration of time since detecting the charging event.

6. The method of claim 5, wherein conditionally performing the automatic transitioning is responsive to one or more settings of the telecommunication device.

7. The method of claim 1, further comprising, upon detecting the charging event, determining a location of the telecommunication device and performing the automatic transitioning conditionally based at least in part on the determined location.

8. The method of claim 1, wherein detecting the charging event comprises determining that a universal serial bus (USB) cord attached to the telecommunication device has been plugged into a USB port of a computing device, and the method further comprises engaging in data communication through a USB connection with the computing device in place of automatically transitioning the wireless communication transceiver from the off mode to the on mode of the wireless communication transceiver.

9. A method comprising:
    determining, by a telecommunication device, that the telecommunication device is at or proximate to a specified geographic location, wherein the telecommunication device is in an on mode and a wireless communication transceiver of the telecommunication device is in an off mode when performing the determining; and
    based at least in part on the determining, automatically transitioning, by the telecommunication device, the wireless communication transceiver from the off mode to an on mode to cause the wireless communication transceiver to connect to and communicate over a wireless data network, the on mode and off mode of the wireless communication transceiver being separate and distinct from the on mode and an off mode of the telecommunication device.

10. The method of claim 9, further comprising determining a battery power level of the telecommunication device.

11. The method of claim 10, further comprising performing the automatic transitioning conditionally based at least in part on the battery power level exceeding a threshold.

12. The method of claim 11, wherein the threshold is defined by one or more settings of the telecommunication device.

13. The method of claim 9, wherein the specified geographic location is one of a home, an office, or another geographic location likely to have a wireless data network access point.

14. The method of claim 9, wherein the determining comprises determining a current geographic location of the telecommunication device.

15. The method of claim 9, wherein the determining comprises receiving a message from a service provider informing the telecommunication device that the telecommunication device is at or proximate to the specified geographic location.

16. The method of claim 15, wherein the message instructs the telecommunication device to perform the automatic transitioning.

17. The method of claim 9, further comprising performing at least one of downloading a software update, recovering data, or backing up data in response to the automatic transitioning, wherein the downloading, recovering, or backing up is performed over the wireless data network.

18. A telecommunication device comprising:
    a processor;
    a wireless communication transceiver coupled to the processor; and
    executable instructions configured to be operated by the processor to perform operations including:
        determining at least one of an occurrence of a charging event associated with the telecommunication device or presence of the telecommunication device at or proximately to a specified location, wherein the telecommunication device is in an on mode and the wireless communication transceiver is in an off mode when performing the determining,
        based at least in part on the determining, automatically transitioning the wireless communication transceiver from the off mode to an on mode to cause the wireless communication transceiver to connect to and communicate over a wireless data network, the on mode and off mode of the wireless communication transceiver being separate and distinct from the on mode and an off mode of the telecommunication device, and
        performing at least one of downloading a software update, recovering data, or backing up data using the wireless data network.

19. The telecommunication device of claim 18, wherein the executable instructions comprise a part of a platform of the telecommunication device, the platform further offering an application programming interface to enable applications to perform software updates, recovery operations, or back up operations over the wireless data network.

20. The telecommunication device of claim 19, wherein the telecommunication device is configured to operate as a wireless data network access point, and the platform provides another application programming interface to enable other applications on devices using the telecommunication device as the wireless data network access point to perform software updates, recovery operations, or back up operations over the wireless data network.

* * * * *